(12) United States Patent
Reichert et al.

(10) Patent No.: US 7,980,154 B2
(45) Date of Patent: Jul. 19, 2011

(54) GEARBOX SHIFTING DEVICE AND GEARBOX COMPRISING A GEARBOX SHIFTING DEVICE

(75) Inventors: Heinz Reichert, Markdorf (DE); Ulrich Mair, Friedrichshafen (DE); Jörg Kurth, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 248 days.

(21) Appl. No.: 12/306,730

(22) PCT Filed: Jun. 29, 2007

(86) PCT No.: PCT/EP2007/056553
§ 371 (c)(1),
(2), (4) Date: Dec. 29, 2008

(87) PCT Pub. No.: WO2008/003650
PCT Pub. Date: Jan. 10, 2008

(65) Prior Publication Data
US 2010/0058886 A1    Mar. 11, 2010

(30) Foreign Application Priority Data
Jul. 5, 2006    (DE) .......................... 10 2006 030 997

(51) Int. Cl.
*B60K 20/00* (2006.01)
*G05G 5/00* (2006.01)
*G05G 5/08* (2006.01)

(52) U.S. Cl. ................................. 74/473.25; 74/473.21
(58) Field of Classification Search ................ 74/473.1, 74/473.21, 473.24, 473.25, 473.36, 469
See application file for complete search history.

(56) References Cited

U.S. PATENT DOCUMENTS

| | | | | |
|---|---|---|---|---|
| 4,658,667 | A | * | 4/1987 | Schuller ..................... 74/473.14 |
| 5,794,748 | A | | 8/1998 | Heuver et al. |
| 5,893,439 | A | | 4/1999 | Park |
| 6,098,483 | A | * | 8/2000 | Syamoto et al. ........... 74/473.18 |
| 6,151,976 | A | | 11/2000 | Inoue |
| 6,658,960 | B2 | * | 12/2003 | Babin et al. ................ 74/473.28 |
| 6,994,650 | B2 | | 2/2006 | Allen et al. |
| 2004/0002399 | A1 | | 1/2004 | Niederwimmer |

FOREIGN PATENT DOCUMENTS

| DE | 196 30 806 A1 | 2/1998 |
|---|---|---|
| DE | 197 44 238 A1 | 4/1998 |
| DE | 10 2004 052 869 A1 | 6/2005 |
| EP | 0 151 024 A2 | 8/1985 |

* cited by examiner

Primary Examiner — Justin Krause
(74) Attorney, Agent, or Firm — Davis & Bujold, P.L.L.C.

(57) ABSTRACT

A transmission shifting device (1) with a selector shaft (2), a disk (7) connected in a rotationally fixed manner to the selector shaft (2), in which a disk-side guide (14) is provided, and a fixed plate (16) arranged opposite the disk (7), in which a plate-side guide (19) is formed. A moving control element (25) is provided for shifting a transmission, which extends into the disk-side and the plate-side guides (14, 19). The disk-side guide (14) extends in the radial direction of the disk (7). A transmission shifting device (1) of this type is particularly compact and takes up only little structural space.

13 Claims, 3 Drawing Sheets

GEARBOX SHIFTING DEVICE AND GEARBOX COMPRISING A GEARBOX SHIFTING DEVICE

This application is a national stage completion of PCT/EP2007/056553 filed Jun. 29, 2009 which claims priority from German patent application serial no. 10 2006 030 997.9 filed Jul. 5, 2006.

FIELD OF THE INVENTION

The present invention concerns a transmission shifting device with a selector shaft, a disk connected in a rotationally fixed manner to the selector shaft, in which a guide is provided on the disk side, and a fixed plate arranged opposite the disk, in which a guide is formed on the plate side, a moving control element for shifting a transmission being provided, which extends into the disk-side and the plate-side guide. The present invention also concerns a transmission comprising a transmission shifting device of this type.

BACKGROUND OF THE INVENTION

From the prior art various transmission shifting devices are known, which serve both to actuate a parking lock and to change the shift position of a transmission. For example, DE 102004 052 869 A1 describes a parking lock mechanism for a transmission. The known parking lock mechanism comprises a gearshift lever whose pivoting movement is transferred, via a shaft, to a detent lever. At its periphery the detent lever has teeth in which a detent spring can engage. To the detent lever is also articulated a parking rod, which can be pushed in the longitudinal direction by pivoting the detent lever. At the end of the parking rod is a cam which, when the detent lever is in the corresponding position, acts upon a parking pawl which then locks the transmission.

A similar device is also disclosed in DE 196 30 806 A1, where a selector shaft actuated by a selector level is described, a detent disk being provided which is connected rotationally fixed to the selector shaft. To lock the detent disk a positioning element is provided, which slides over outer teeth of the detent disk and can engage in the tooth gaps. To move past the dead point at the peak of an individual tooth a roller is provided on the detent disk, which projects outward above the tooth and over which the positioning element can roll.

In contrast to the prior art mentioned above DE 197 44 238 A1 describes a mechanism which serves not only to activate a parking lock but also to adjust the shift position of a transmission. This known mechanism comprises a shift lever connected in a rotationally fixed manner to a manual control lever. In turn, on the manual control lever is arranged in a rotationally fixed manner a plate component, which is provided along a circumferential section with teeth in which a locking spring can engage. In the plate component is provided a slot, which extends in the circumferential direction of the plate component and has a shape that deviates from a straight line. Opposite the plate component there is a so-termed reaction support, which is also plate-shaped and is fixed to the housing of the device. A slot is also provided in the reaction support. The known mechanism comprises in addition a rod, one end of which projects into the slots in the plate component and the reaction support, while its other end is connected to a transmission valve of the transmission. When the plate component rotates, the one end of the rod follows the irregular path within the slot in the plate component and causes the transmission valve to move one way or the other. Rotating the plate component changes the position of the transmission valve and thus also the shift position of the transmission. The function of the slot in the reaction support is to restrict the degree of freedom of the rod's movement.

However, the known mechanism has certain disadvantages. For one thing, the rotating plate component must be made very large to accommodate the slot extending in its circumferential direction. Consequently the known mechanism takes up a large structural space. For another thing, the known mechanism is not so easy to adapt to different vehicle shift systems.

SUMMARY OF THE INVENTION

The purpose of the present invention is therefore to provide a transmission shifting device which is compactly built, takes up little structural space and can be easily adapted to different vehicle shift systems. A further purpose of the invention is to provide a transmission with an advantageous transmission shifting device of this type.

The transmission shifting device according to the invention comprises a selector shaft. To the selector shaft is connected, in a rotationally fixed manner, a disk in which a disk-side guide is provided. Opposite the disk is arranged a fixed plate in which a plate-side guide is formed. Thus, the disk can be moved relative to the fixed plate by means of the selector shaft. In addition a movable control element for shifting a transmission is provided, which extends into the disk-side and plate-side guides. The movable control element can be for example a control rod which extends on one side to the transmission and on the other side into the guides. The disk-side guide extends in the radial direction of the disk.

Since the disk-side guide extends in the radial direction of the disk, the disk can be made very compact. In contrast to the prior art it is not necessary to make the disk wide enough to accommodate a guide extending in the circumferential direction. The function of deflecting or moving the control element is, rather, assumed by the plate-side guide in the fixed plate, which has a correspondingly designed shape. Although, therefore, the fixed plate has to be correspondingly larger or wider, in contrast to the disk it is not rotated or pivoted and the structural space it occupies is thus substantially smaller. Moreover, the transmission shifting device according to the invention is simple to adapt to different vehicle shift systems since it is only necessary to exchange the fixed plate or the disk as well.

In a preferred embodiment of the transmission shifting device according to the invention the disk-side guide is rectilinear. This enables the disk to be made particularly compact.

In a particularly preferred embodiment of the transmission shifting device according to the invention the disk-side guide extends along a straight line passing through the rotation axis of the selector shaft. With this configuration the width of the disk in the area of the disk-side guide can be chosen particularly small, so that the disk is particularly compact. If necessary, however, the disk-side guide can also deviate angularly from the line.

To ensure reliable guiding of the control element within the disk-side and the plate-side guides, in an advantageous embodiment of the transmission shifting device according to the invention the plate-side guide extends transversely with respect to the disk-side guide regardless of the rotation position of the disk.

To enable the plate-side guide to produce the deflection or movement of the control element as a function of the rotation position of the disk, in a further advantageous embodiment of the transmission shifting device according to the invention the plate-side guide has a shape that deviates from a straight line. For example, a plurality of straight sections may follow one another at an angle, but curved shapes of the plate-side guide are also conceivable.

To be able to provide a transmission shifting device which enables particularly simple and secure change of the shift position of a transmission, in another advantageous embodiment of the transmission shifting device according to the invention the control element is a control rod for adjusting the transmission valve of an automatic transmission.

In a further advantageous embodiment of the transmission shifting device according to the invention the control rod has a pin-shaped end which extends into the disk-side and plate-side guides. The pin-shaped end could for example be arranged on the control rod at an angle in order to project into the guides.

To enable the plate to be fixed relative to the disk, in a further preferred embodiment of the transmission shifting device according to the invention a housing is provided to accommodate the disk and at least part of the selector shaft, and the plate is fixed onto the housing. The housing could for example even be the housing of the transmission itself.

To enable the transmission shifting device to be adapted quickly to different vehicle shift systems, in another preferred embodiment of the transmission shifting device according to the invention the plate is fixed detachably to the housing. Preferably, this detachable fixing is done with the help of screws. To adapt the transmission shifting device to a different vehicle shift system, it is then only necessary to replace the plate by a plate with a different plate-side guide.

In a further advantageous embodiment of the transmission shifting device according to the invention a selector lever for rotating the selector shaft is provided, which is arranged outside the housing. This can be a shift lever as known from motor vehicles.

To simplify further the replacement of the fixed plate, in another advantageous embodiment of the transmission shifting device according to the invention the plate is arranged on the inside of the housing. The plate is preferably arranged close to the selector lever.

According to a further advantageous embodiment of the transmission shifting device according to the invention the disk is formed as a detent disk, with peaks and troughs between the peaks. Consequently it is not necessary to have two disks, but rather, both the guiding function and the locking function are carried out by the detent disk, so that less structural space is needed.

To enable the detent disk to be locked in a predetermined rotation position, in a further advantageous embodiment of the transmission shifting device according to the invention a fixed detent element is provided, which can engage in the said troughs. This can be a positioning, locking or arrest element as known from the prior art. The detent element can for example be attached on the housing so that it is in a fixed position relative to the detent disk.

In a particularly preferred embodiment of the transmission shifting device according to the invention the disk-side guide is arranged on the side of the disk opposite to the peaks and troughs. This displacement to the opposite side of the detent disk enables the latter to have a smaller diameter, since the guide and the peaks and troughs do not have to be arranged one behind another on one side. This results in a smaller detent disk and a more compact structure of the transmission shifting device.

In another advantageous embodiment of the transmission shifting device according to the invention the disk-side and plate-side guides are in the form of guide slots. Accordingly, the control element can extend from one side through one guide and into the other guide positioned behind it.

For the transmission shifting device also to enable the activation of a parking lock, in a further preferred embodiment of the transmission shifting device according to the invention a second disk-side guide and a second plate-side guide are provided, and the transmission shifting device also comprises a second control element for adjusting a parking lock, which extends into the second disk-side and second plate-side guides. The characteristics described earlier apply just as well to the second disk-side guide, the second plate-side guide and the second control element.

The transmission according to the invention, which is preferably an automatic transmission, comprises a transmission shifting device of the type described above.

BRIEF DESCRIPTION OF THE DRAWINGS

Below, the invention is explained in more detail with reference to an example embodiment and to the associated drawing.

The figures show.

DETAILED DESCRIPTION OF THE PREFERRED EMBODIMENTS

Figure 1:
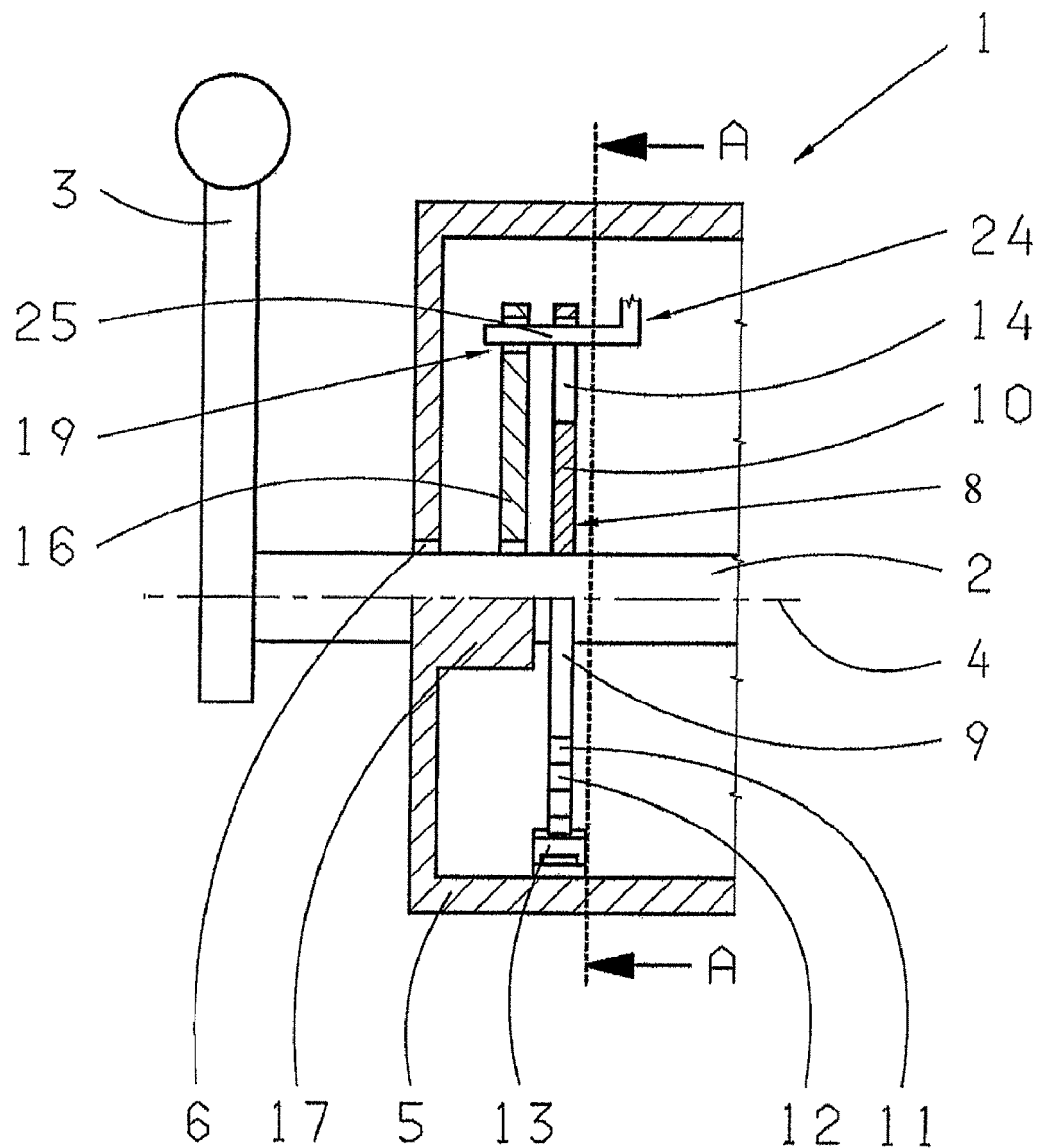
FIG. 1 is a front view of an embodiment of the transmission shifting device according to the invention, shown in section.
Figure 2:
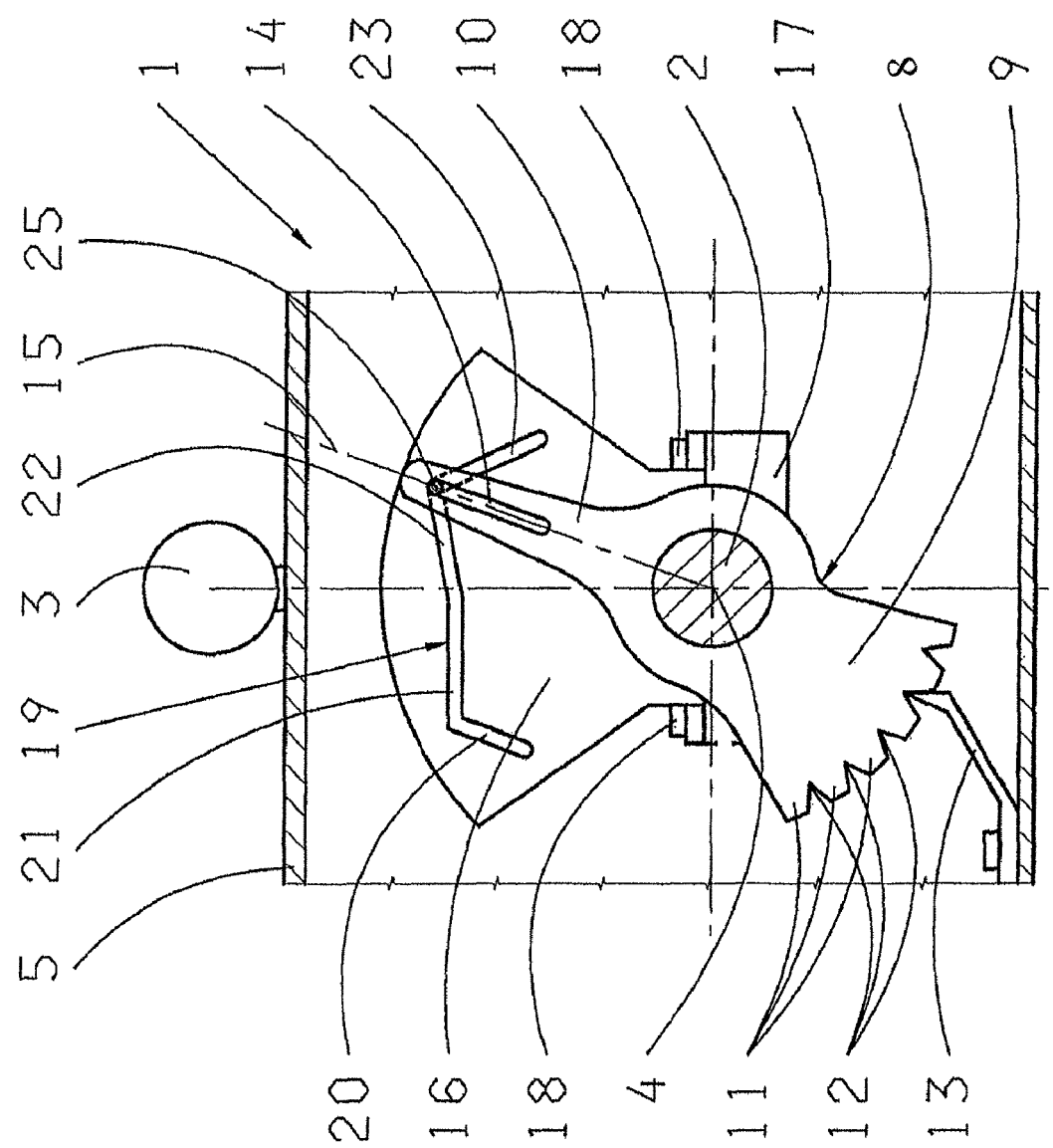
FIG. 2 is a view from above, along the section line A-A in FIG. 1.

FIGS. 1 and 2 show an embodiment of the transmission shifting device 1 for an automatic transmission (not shown). The transmission shifting device 1 comprises a selector shaft 2. The selector shaft 2 is connected in a rotationally fixed manner to a selector lever 3 with the help of which the selector shaft 2 can be rotated about a rotational axis 4. The transmission shifting device 1 also comprises a housing 5 and the selector shaft 2, starting from the selector lever which is arranged outside the housing 5, extends through an opening 6 into the housing 5. The housing 5 can be made as part of the transmission housing itself.

Inside the housing 5 a detent disk 8 is connected in a rotationally fixed manner to the selector shaft 2, the detent disk 8 extending perpendicularly to the rotational axis 4 of the selector shaft 2. In the embodiment illustrated the detent disk 8 and comprises a first disk section 9 and a second disk section 10. The two disk sections 9, 10 extend radially outward in opposite directions and, relative to the rotational axis 4 of the selector shaft 2, are therefore formed on opposite sides of the detent disk 8.

On the radially outward-facing edge of the first disk section 9 are formed a plurality of peaks 11 with troughs 12 between them. A detent element 13 pre-stressed against the radially outward-facing edge of the first disk section 9 can engage in the troughs 12, the element being attached on the housing 5 and thus arranged in a fixed position relative to the detent disk 8. Depending on the rotation position of the detent disk 8, the detent element 13 can engage in the various troughs 12 and so lock the detent disk 8 in the corresponding position.

In the second disk section 10, which is arranged on the side opposite to the first disk section 9, a disk-side guide 14 is formed. The disk-side guide 14 is in the form of a guide slot and extends in the radial direction of the detent disk 8. This disk-side guide 14 is rectilinear and extends along a radial line 15 which passes through the rotational axis 4 of the selector shaft 2, as can be seen particularly clearly in FIG. 2.

In the direction of the rotational axis 4 of the selector shaft 2 a fixed plate 16 is arranged opposite the detent disk 8, in particular positioned opposite the second disk section 10 of the detent disk 8. The plate 16 is fixed detachably by means of screws 18 inside the housing 5 onto a projection 17 thereof, so that relative movement between the detent disk 8 and the plate 16 is possible when the selector shaft 2 together with the detent disk 8 are rotated. In the plate 16, which extends parallel to the detent disk 8, is formed a plate-side guide 19 in the form of a guide slot. The plate-side guide 19 comprises a plurality of straight guide sections, 20, 21, 22, 23 arranged in succession and at an angle to one another, so that the shape of the plate-side guide 19 deviates from a rectilinear shape. In this case the shape of the plate-side guide 19 is chosen such that regardless of the rotation position of the detent disk 8, the plate-side guide 19 always extends transversely to the disk-side guide 14, as can be seen particularly clearly in FIG. 2.

The transmission shifting device 1 also comprises a control element 24 for shifting the transmission, which is shown only in part in FIG. 1. The control element 24 is in the form of a control rod which serves to adjust a transmission valve (not shown) of the automatic transmission, whereby, by adjusting the transmission valve, the shift position of the automatic transmission is changed. The control element 24 or control rod has a pin-shaped end 25 which extends through the disk-side guide 14 and the plate-side guide 19.

Below, the mode of operation of the transmission shifting device 1 shown will be explained. If the selector lever 3 is pivoted, the selector shaft 2 rotates and the detent disk 8 on it turns about the rotational axis 4. The pin-shaped end 25 of the control element 24 is located in the disk-side guide 14 and is therefore pivoted by the detent disk 8, so that the pin-shaped end 25 is guided along the plate-side guide 19. Since the shape of the plate-side guide 19 deviates from the rectilinear, the pin-shaped end 25 is correspondingly deflected and thus guided radially in the disk-side guide 14. This deflection is transmitted, via the control element 24 or control rod, to the transmission valve (not shown), which is adjusted thereby.

Thanks to the radial, straight orientation of the disk-side guide 14, the disk can be made very compact. The function of deflecting the control element 24 is assumed by the plate-side guide 19 in the fixed plate 16. Moreover, the transmission shifting device 1 can be adapted to different vehicle shift systems in a simple manner since it is only necessary to exchange the fixed plate 16 or possibly the detent disk 8 as well.

To further simplify the adaptation of the transmission shifting device 1 to different vehicle shift systems, in another embodiment similar to the embodiment described the fixed plate 16 is attached on the outside of the housing 5, preferably close to the selector lever 3.

Figure 3:
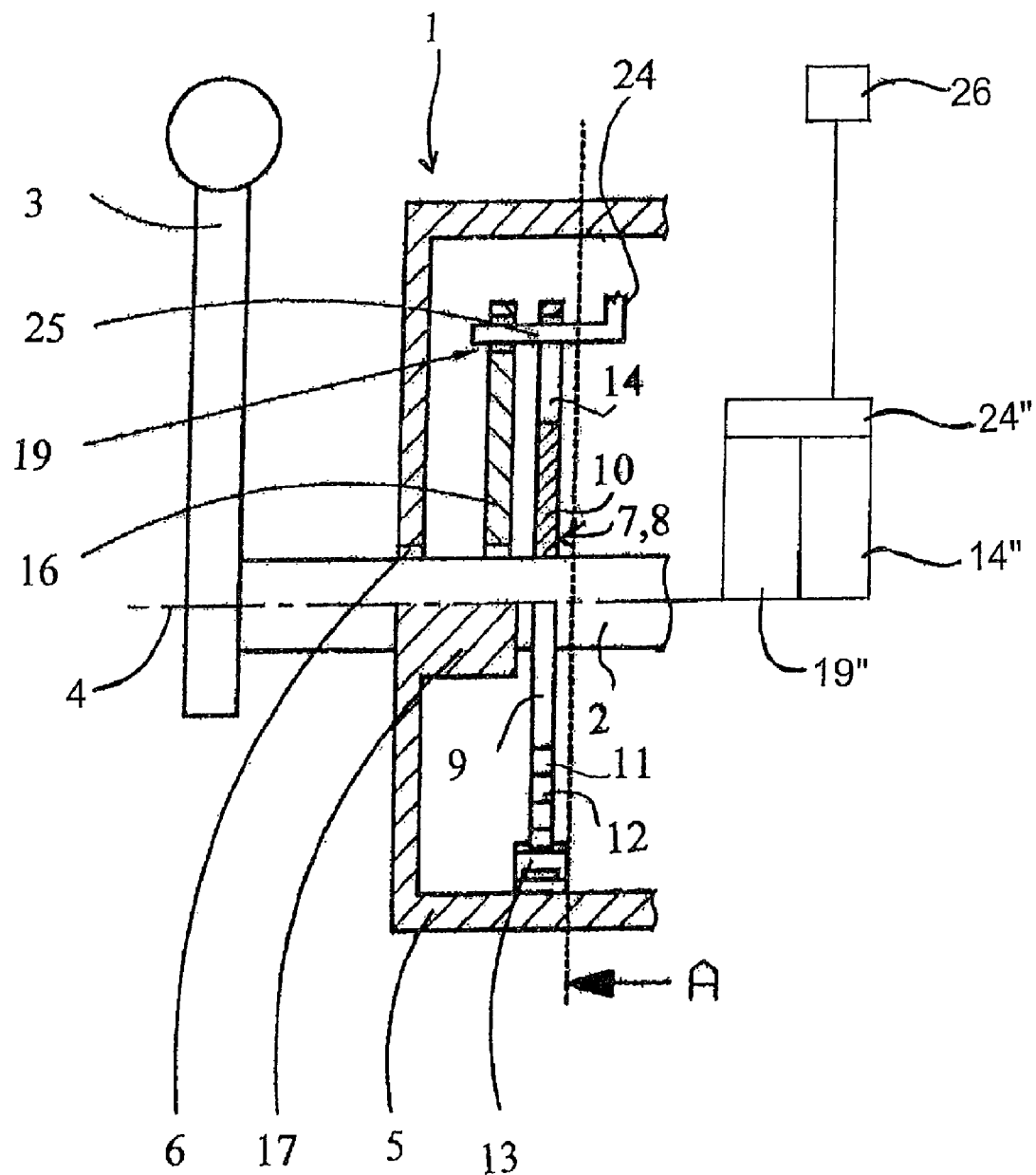
FIG. 3 is a front view of an alternate embodiment of the transmission shifting device.

To enable the transmission shifting device also to activate a parking lock 26, in a further preferred embodiment of the transmission shifting device 1 as shown in FIG. 3 a second disk-side guide 14" and a second plate-side guide 19" are provided, and the transmission shifting device 1 also comprises a second control element 24" for actuating a parking lock 26, which extends into said second disk-side and plate-side guides 14" and 19". For the second disk-side guide 14", the second plate-side guide 19" and the second control element 24", the characteristics described earlier with respect to the disk-side guide 14, the plate-side guide 19 and the control element 24 apply correspondingly.

INDEXES

1 Transmission shifting device
2 Selector shaft
3 Selector level
4 Rotational axis
5 Housing
6 Opening
7 Disk
8 Detent disk
9 First disk section
10 Second disk section
11 Peaks
12 Troughs
13 Detent element
14 Disk-side guide
15 Straight line
16 Fixed plate
17 Projection
18 Screws
19 Plate-side guide
20 Guide section
21 Guide section
22 Guide section
23 Guide section
24 Control element/control rod
25 Pin-shaped end

The invention claimed is:

1. A transmission shifting device comprising a selector shaft (2), a detent disk (8) connected in a rotationally fixed manner to the selector shaft (2), in which a disk-side guide (14) is provided, and a fixed plate (16) arranged opposite the detent disk (8), in which a plate-side guide (19) is formed, a moving control element (24) being provided for shifting a transmission, which extends into the disk-side guide (14) and the plate-side guide (19), the disk-side guide (14) extends in a radial direction of the detent disk (8), is of rectilinear shape, and extends along a straight line (15) which passes through a rotational axis (4) of the selector shaft (2), the detent disk (8) is a disk with peaks (11) and troughs (12) that are located between adjacent peaks (11), and the disk-side guide (14) is arranged on a side of the detent disk (8) diametrically opposed to the peaks (11) and the troughs (12).

2. The transmission shifting device according to claim 1, wherein the plate-side guide (19) extends transversely relative to the disk-side guide (14), regardless of a rotation position of the detent disk (8).

3. The transmission shifting device according to claim 1, wherein the plate-side guide (19) has a shape which deviates from the rectilinear shape.

4. The transmission shifting device according to claim 1, wherein the control element (24) is a control rod for adjusting a transmission valve of an automatic transmission.

5. The transmission shifting device according to claim 4, wherein the control rod has a pin-shaped end (25) which extends into the disk-side guide (14) and the plate-side guide (19).

6. The transmission shifting device according to claim 1, wherein a housing (5) accommodates the detent disk (8), and at least part of the selector shaft (2) and the plate (16) is fixed to the housing (5).

7. The transmission shifting device according to claim 6, wherein the plate (16) is detachably fixed to the housing (5) by screws (18).

8. The transmission shifting device according to claim 6, wherein a selector lever (3), which turns the selector shaft (2), is arranged outside the housing (5).

9. The transmission shifting device according to claim 6, wherein the plate (16) is fixed on the inside of the housing (5) adjacent the selector lever (3).

10. The transmission shifting device according to claim 1, wherein a fixed detent element (13) engages with one of the troughs (12).

11. The transmission shifting device according to claim 1, wherein the disk-side guide (14) and the plate-side guide (19) are guide slots.

12. The transmission shifting device according to claim 1, further comprising a second disk-side guide (14") and a second plate-side guide (19"), and the transmission shifting device (1) comprises a second control element (24") for actuating a parking lock (26) which extends into the second disk-side guide (14") and the second plate-side guide (19").

13. An automatic transmission in combination with a transmission shifting device comprising a selector shaft (2), a detent disk (8) connected in a rotationally fixed manner to the selector shaft (2), in which a disk-side guide (14) is provided, and a fixed plate (16) arranged opposite the detent disk (8), in which a plate-side guide (19) is formed, a moving control element (24) being provided for shifting a transmission, which extends into the disk-side guide (14) and the plate-side guide (19), the disk-side guide (14) extends in a radial direction of the detent disk (8), is of rectilinear shape, and extends along a straight line (15) which passes through a rotational axis (4) of the selector shaft (2), with a transmission shifting device (1), the detent disk (8) is a disk with peaks (11) and troughs (12) that are located between adjacent peaks (11), and the disk-side guide (14) is arranged on a side of the detent disk (8) diametrically opposed to the peaks (11) and the troughs (12).

* * * * *